United States Patent
Xie et al.

(10) Patent No.: US 9,708,192 B2
(45) Date of Patent: Jul. 18, 2017

(54) METHOD FOR PREPARING ALUMINOSILICATE MOLECULAR SIEVES HAVING THE CHA FRAMEWORK TYPE

(71) Applicants: Dan Xie, Richmond, CA (US); Stacey Ian Zones, San Francisco, CA (US)

(72) Inventors: Dan Xie, Richmond, CA (US); Stacey Ian Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 500 days.

(21) Appl. No.: 14/553,672

(22) Filed: Nov. 25, 2014

(65) Prior Publication Data

US 2016/0145111 A1 May 26, 2016

(51) Int. Cl.
*C01B 39/48* (2006.01)
*B01J 29/70* (2006.01)

(52) U.S. Cl.
CPC .......... *C01B 39/48* (2013.01); *B01J 29/7015* (2013.01)

(58) Field of Classification Search
CPC .............................. C01B 39/48; B01J 29/7015
See application file for complete search history.

(56) References Cited

U.S. PATENT DOCUMENTS

| | | |
|---|---|---|
| 4,544,538 A | 10/1985 | Zones |
| 7,402,297 B2 | 7/2008 | Yuen |
| 7,670,589 B2 | 3/2010 | Cao et al. |
| 7,754,187 B2 | 7/2010 | Cao et al. |
| 8,007,764 B2 | 8/2011 | Miller et al. |
| 8,048,402 B2 | 11/2011 | Cao et al. |
| 8,298,511 B2 | 10/2012 | Zones |
| 9,636,667 B2 * | 5/2017 | Feyen .................. B01J 29/7015 |
| 2007/0100185 A1 | 5/2007 | Cao et al. |
| 2008/0045767 A1 | 2/2008 | Cao et al. |
| 2010/0254895 A1 | 10/2010 | Zones |
| 2013/0323164 A1 | 12/2013 | Feyen et al. |
| 2014/0147378 A1 | 5/2014 | Davis et al. |
| 2016/0375428 A1 * | 12/2016 | Xie .......................... B01J 29/50 423/704 |

FOREIGN PATENT DOCUMENTS

EP    2657190    10/2013

OTHER PUBLICATIONS

PCT International Search Report, PCT/US2015/029461, mailed Sep. 11, 2015.

* cited by examiner

*Primary Examiner* — David M Brunsman
(74) *Attorney, Agent, or Firm* — Terrence M. Flaherty

(57) ABSTRACT

A method is disclosed for preparing pure phase aluminosilicate molecular sieves having the CHA framework type using a trimethylphenylammonium cation as a structure directing agent.

9 Claims, 2 Drawing Sheets

METHOD FOR PREPARING ALUMINOSILICATE MOLECULAR SIEVES HAVING THE CHA FRAMEWORK TYPE

TECHNICAL FIELD

This disclosure is directed to methods for preparing aluminosilicate molecular sieves having the CHA framework type using a trimethylphenylammonium cation.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves identified by the International Zeolite Association as having the framework type CHA are known. For example, the aluminosilicate molecular sieve known as SSZ-13 is a known crystalline CHA material. U.S. Pat. No. 4,544,538 discloses SSZ-13 and its synthesis using N-alkyl-3-quinuclidinol, N,N,N-trialkyl-1-adamantammonium cations and/or N,N,N-trialkyl-exoaminonorbornane as a structure directing agent ("SDA").

SSZ-13 is generally synthesized commercially using N,N,N-trimethyl-1-adamantammonium cation as a structure directing agent. However, this SDA is costly, which makes the synthesis of SSZ-13 using this SDA costly. This cost can limit the usefulness of SSZ-13 in commercial processes. Consequently, there has been significant interest in finding alternative, less expensive structure directing agents for the synthesis of SSZ-13.

It has now been found that pure phase aluminosilicate molecular sieves having the CHA framework type can be prepared using a trimethylphenylammonium cation as a structure directing agent.

SUMMARY

In one aspect, there is provided a method for making an aluminosilicate molecular sieve having the CHA framework type which comprises (a) preparing a reaction mixture containing: (1) a source of silicon; (2) a source of aluminum; (3) at least one source of an element selected from Groups 1 and 2 of the Periodic Table; (4) hydroxide ions; (5) trimethylphenylammonium cations; and (6) water; and (b) subjecting the reaction mixture to crystallization conditions sufficient to form crystals of the molecular sieve.

In another aspect, there is provided an aluminosilicate molecular sieve having the CHA framework type and having a composition, as-synthesized and in the anhydrous state, in terms of mole ratios, as follows:

|  | Broad | Exemplary |
|---|---|---|
| $SiO_2/Al_2O_3$ | 5 to 350 | 8 to 50 |
| $Q/SiO_2$ | 0.015 to 0.15 | 0.04 to 0.10 |
| $M/SiO_2$ | 0.010 to 0.20 | 0.05 to 0.20 | wherein Q is a trimethylphenylammonium cation and M is selected from the group consisting of elements from Groups 1 and 2 of the Periodic Table.

DETAILED DESCRIPTION

Introduction

Figure 1:
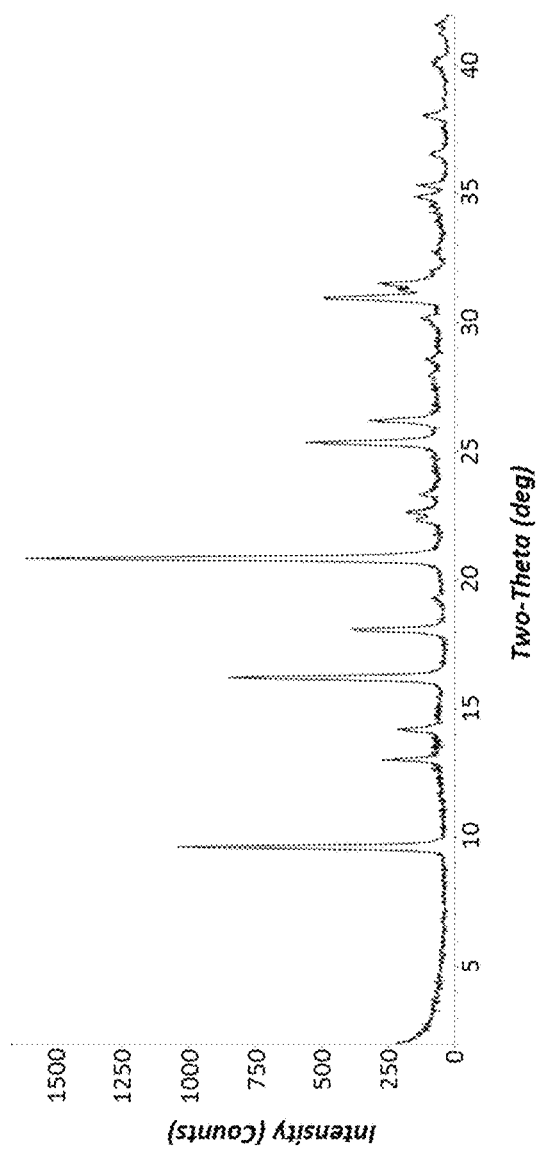
FIG. 1 is a powder X-ray diffraction (XRD) pattern of the as-synthesized molecular sieve prepared in Example 1.

The following terms will be used throughout the specification and will have the following meanings unless otherwise indicated.

The term "framework type" is used in the sense described in the "Atlas of Zeolite Framework Types," Sixth Revised Edition, Elsevier, 2007.

The term "aluminosilicate" refers to molecular sieves having a three-dimensional microporous framework structure of $AlO_2$ and $SiO_2$ tetrahedral oxide units. As used herein, reference to an aluminosilicate molecular sieve limits the material to molecular sieves that do not include phosphorus or other metals substituted in the framework of the molecular sieve. Of course, aluminosilicate molecular sieves can be subsequently ion-exchanged with one or more promoter metals such as iron, copper, cobalt, nickel, cerium or platinum group metals. However, to be clear, as used herein, the term "aluminosilicate" excludes aluminophosphate materials such as silicoaluminophosphate (SAPO), aluminophosphate (AlPO), and metalloaluminophosphate (MeAPO) materials.

As used herein, the numbering scheme for the Periodic Table Groups is as disclosed in Chem. Eng. News, 63(5), 27 (1985).

In preparing the aluminosilicate CHA framework type molecular sieves disclosed herein, a trimethylphenylammonium cation is used as the structure directing agent ("SDA"), also known as a crystallization template. The SDA is represented by the following structure (1):

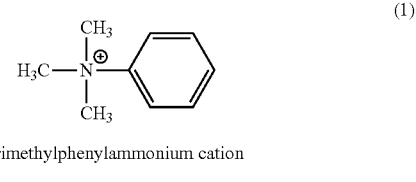

trimethylphenylammonium cation

The SDA cation is typically associated with anions which can be any anion that is not detrimental to the formation of the molecular sieve. Representative anions include elements from Group 17 of the Periodic Table (e.g., fluoride, chloride, bromide and iodide), hydroxide, acetate, carboxylate, sulfate, tetrafluoroborate, and the like.

Reaction Mixture

In general, the CHA framework type molecular sieve is prepared by: (a) preparing a reaction mixture containing (1) a source of silicon; (2) a source of aluminum; (3) at least one source of an element selected from Groups 1 and 2 of the Periodic Table; (4) hydroxide ions; (5) trimethylphenylammonium cations; and (6) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants | Broad | Exemplary |
|---|---|---|
| $SiO_2/Al_2O_3$ | 5 to 350 | 8 to 50 |
| $M/SiO_2$ | 0.01 to 0.80 | 0.20 to 0.60 |
| $Q/SiO_2$ | 0.05 to 0.40 | 0.10 to 0.30 |
| $OH/SiO_2$ | 0.15 to 1.00 | 0.25 to 0.80 |
| $H_2O/SiO_2$ | 10 to 100 | 15 to 50 | wherein compositional variables M and Q are as described herein above.

Sources useful herein for silicon include fumed silica, precipitated silicates, silica hydrogel, silicic acid, colloidal silica, tetraalkyl orthosilicates (e.g., tetraethyl orthosilicate), and silica hydroxides.

Sources useful herein for aluminum include oxides, hydroxides, acetates, oxalates, ammonium salts and sulfates of aluminum. Typical sources of aluminum oxide include aluminates, alumina, and aluminum compounds such as $AlCl_3$, $Al_2(SO_4)_3$, $Al(OH)_3$, kaolin clays, and other zeolites. An example of the source of aluminum is zeolite Y.

The reaction mixture can be formed using at least one source of an element selected from Groups 1 and 2 of the Periodic Table (referred to herein as "M"). In one embodiment, the reaction mixture is formed using a source of an element from Group 1 of the Periodic Table. In one embodiment, the reaction mixture is formed using a source of sodium (Na). Any M-containing compound which is not detrimental to the crystallization process is suitable. Sources for such Groups 1 and 2 elements include oxides, hydroxides, halides, nitrates, sulfates, acetates, oxalates, and citrates thereof.

For each embodiment described herein, the molecular sieve reaction mixture can be supplied by more than one source. Also, two or more reaction components can be provided by one source.

In one embodiment, the source of silicon and aluminum comprises zeolite Y. Zeolite Y can have a $SiO_2/Al_2O_3$ mole of at least 5 (e.g., from 5 to 80, from 5 to 60, from 5 to 30, from 5 to 15, from 10 to 80, from 10 to 60, from 10 to 30, from 30 to 80, or from 30 to 60).

The reaction mixture can be prepared either batch wise or continuously. Crystal size, morphology and crystallization time of the molecular sieve disclosed herein can vary with the nature of the reaction mixture and the crystallization conditions.

Crystallization and Post-Synthesis Treatment

In practice, the molecular sieve is prepared by: (a) preparing a reaction mixture as described herein above; and (b) subjecting the reaction mixture to crystallization conditions sufficient for form crystals of the molecular sieve (see, e.g., H. Robson, "*Verified Syntheses of Zeolitic Materials*," Second Revised Edition, Elsevier, 2001).

The reaction mixture is maintained at an elevated temperature until the molecular sieve is formed. The hydrothermal crystallization is usually conducted under pressure, and usually in an autoclave so that the reaction mixture is subject to autogenous pressure, at a temperature of from 125° C. to 200° C.

The reaction mixture can be subjected to mild stirring or agitation during the crystallization step. It will be understood by a skilled artisan that the molecular sieves described herein can contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for silicon used in the reaction mixture. In one embodiment, the hydrothermal crystallization is carried out in the absence of seed crystals.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by a skilled artisan sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion-exchange or other known method and replace it with hydrogen, ammonium, or any desired metal-ion.

Where the molecular sieve formed is an intermediate material, the target molecular sieve can be achieved using post-synthesis techniques, such as heteroatom lattice substitution techniques. The target molecular sieve (e.g., silicate SSZ-13) can also be achieved by removing heteroatoms from the lattice by known techniques such as acid leaching.

Characterization of the Molecular Sieve

The aluminosilicate CHA framework type molecular sieves synthesized by the process described herein have a composition, as-synthesized and in the anhydrous state, as described in Table 2 (in terms of mole ratios):

TABLE 2

|  | Broad | Exemplary |
|---|---|---|
| $SiO_2/Al_2O_3$ | 5 to 350 | 8 to 50 |
| $Q/SiO_2$ | 0.015 to 0.15 | 0.04 to 0.10 |
| $M/SiO_2$ | 0.010 to 0.20 | 0.05 to 0.20 | wherein compositional variables Q and M are as described herein above.

The aluminosilicate CHA framework type molecular sieves prepared by the process disclosed herein are characterized by their X-ray diffraction pattern. X-ray diffraction patterns representative of CHA framework type molecular sieves can be referenced in the "*Collection of Simulated XRD Powder Patterns for Zeolites*," Fifth Revised Edition, Elsevier, 2007. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the X-ray diffraction pattern. Notwithstanding these minor pertubations, the basic crystal structure remains unchanged.

The powder X-ray diffraction patterns presented herein were collected by standard techniques. The radiation was $CuK_\alpha$ radiation. The peak heights and the positions, as a function of $2\theta$ where $\theta$ is the Bragg angle, were read from the relative intensities of the peaks (adjusting for background), and d, the interplanar spacing corresponding to the recorded lines, can be calculated.

The aluminosilicate CHA framework type molecular sieves disclosed herein can be prepared in essentially pure form with little or no detectable impurity crystal phases. In one embodiment, the aluminosilicate CHA framework type molecular sieves prepared in accordance with this disclosure are substantially free of non-CHA framework type molecular sieve impurities. By "substantially free of non-CHA framework type zeolite impurities" is meant that the composition does not contain non-CHA framework type phases, as measured by X-ray diffraction. The presence of these impurities can be determined and quantified by analysis of the X-ray diffraction pattern of a sample.

EXAMPLES

The following illustrative examples are intended to be non-limiting.

Example 1

0.32 g of a 50% NaOH solution, 2.40 g of deionized water and 1.20 g of a 20% trimethylphenylammonium hydroxide solution (Sigma-Aldrich) were mixed together in a Teflon liner. Then, 0.50 g of CBV720 Y-zeolite powder (Zeolyst International, $SiO_2/Al_2O_3$ mole ratio=30) was added to the solution. The gel was stirred until homogeneous. The liner was then capped and placed within a Parr steel autoclave reactor. The autoclave was then fixed on a rotating spit (43 rpm) within an oven and heated at 135° C. for 4 days. The solid products were recovered from the cooled reactor by centrifugation, washed with deionized water and dried at 95° C.

Figure 2:
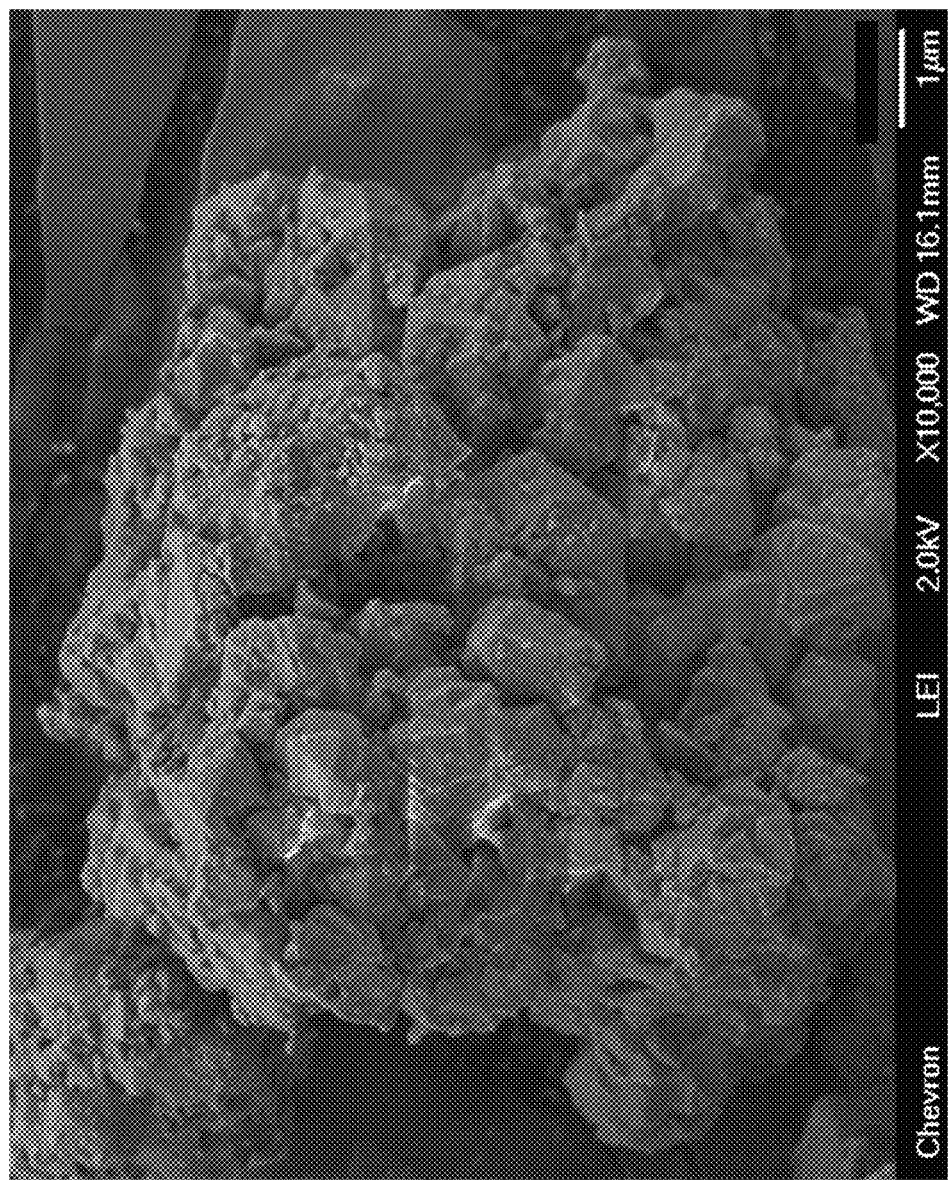
FIG. 2 is a Scanning Electron Micrograph (SEM) image of the as-synthesized molecular sieve prepared in Example 1.

The resulting molecular sieve product was analyzed by powder XRD and SEM. The powder XRD pattern shown in FIG. 1 indicates the material is a pure phase CHA framework type molecular sieve. The SEM image shown in FIG. 2 indicates a uniform field of crystals.

The as-synthesized product had a $SiO_2/Al_2O_3$ mole ratio of 19.2, as determined by ICP elemental analysis.

Example 2

0.33 g of a 50% NaOH solution, 2.47 g of deionized water and 1.24 g of a 20% trimethylphenylammonium hydroxide solution (Sigma-Aldrich) were mixed together in a Teflon liner. Then, 0.50 g of CBV760 Y-zeolite powder (Zeolyst International, $SiO_2/Al_2O_3$ mole ratio=60) was added to the solution. The gel was stirred until homogeneous. The liner was then capped and placed within a Parr steel autoclave reactor. The autoclave was then fixed on a rotating spit (43 rpm) within an oven and heated at 135° C. for 3 days. The solid products were recovered from the cooled reactor by centrifugation, washed with deionized water and dried at 95° C.

The resulting powder XRD pattern identified the product of Example 2 as a pure phase CHA framework type molecular sieve.

The as-synthesized product had a $SiO_2/Al_2O_3$ mole ratio of 28.4, as determined by ICP elemental analysis.

Example 3

0.35 g of a 50% NaOH solution, 2.50 g of deionized water and 1.24 g of a 20% trimethylphenylammonium hydroxide solution (Sigma-Aldrich) were mixed together in a Teflon liner. Then, 0.50 g of CBV780 Y-zeolite powder (Zeolyst International, $SiO_2/Al_2O_3$ mole ratio=80) was added to the solution. The gel was stirred until homogeneous. The liner was then capped and placed within a Parr steel autoclave reactor. The autoclave was then fixed on a rotating spit (43 rpm) within an oven and heated at 135° C. for 3 days. The solid products were recovered from the cooled reactor by centrifugation, washed with deionized water and dried at 95° C.

The resulting powder XRD pattern identified the product of Example 3 as a pure phase CHA framework type molecular sieve.

The as-synthesized product had a $SiO_2/Al_2O_3$ mole ratio of 29.6, as determined by ICP elemental analysis.

Example 4

0.83 g of a 50% NaOH solution, 5.62 g of deionized water and 3.59 g of a 20% trimethylphenylammonium hydroxide solution (Sigma-Aldrich) were mixed together in a Teflon liner. Then, 1.00 g of CBV720 Y-zeolite powder (Zeolyst International, $SiO_2/Al_2O_3$ mole ratio=30) and 0.78 g of LUDOX® AS-40 colloidal silica (W.R. Grace & Co.) were added to the solution. The gel was stirred until homogeneous. The liner was then capped and placed within a Parr steel autoclave reactor. The autoclave was then fixed on a rotating spit (43 rpm) within an oven and heated at 135° C. for 4 days. The solid products were recovered from the cooled reactor by centrifugation, washed with deionized water and dried at 95° C.

The resulting powder XRD pattern identified the product of Example 4 as pure phase CHA framework type molecular sieve.

The as-synthesized product had a $SiO_2/Al_2O_3$ mole ratio of 28.8, as determined by ICP elemental analysis.

Example 5

1.04 g of a 50% NaOH solution, 7.39 g of deionized water and 3.61 g of a 20% trimethylphenylammonium hydroxide solution (Sigma-Aldrich) were mixed together in a Teflon liner. Then, 1.00 g of a CBV720 Y-zeolite powder (Zeolyst International, $SiO_2/Al_2O_3$ mole ratio=30) and 1.56 g of LUDOX® AS-40 colloidal silica (W.R. Grace & Co.) were added to the solution. The gel was stirred until homogeneous. The liner was then capped and placed within a Parr steel autoclave reactor. The autoclave was then placed in an oven and heated at 135° C. for 4 days. The solid products were recovered from the cooled reactor by centrifugation, washed with deionized water and dried at 95° C.

The resulting powder XRD pattern identified the product of Example 5 as pure phase CHA framework type molecular sieve.

The as-synthesized product had a $SiO_2/Al_2O_3$ mole ratio of 30.7, as determined by ICP elemental analysis.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

Any term, abbreviation or shorthand not defined is understood to have the ordinary meaning used by a skilled artisan at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

The invention claimed is:

1. A method for preparing an aluminosilicate molecular sieve having the CHA framework type, comprising:
   (a) preparing a reaction mixture containing:
      (1) a source of silicon;
      (2) a source of aluminum;
      (3) at least one source of an element selected from Groups 1 and 2 of the Periodic Table;
      (4) hydroxide ions;
      (5) trimethylphenylammonium cations; and
      (6) water; and
   (b) subjecting the reaction mixture to crystallization conditions sufficient to form crystals of the molecular sieve.

2. The method of claim 1, wherein the molecular sieve is prepared from a reaction comprising, in terms of mole ratios, the following:

| | |
|---|---|
| $SiO_2/Al_2O_3$ | 5 to 350 |
| $M/SiO_2$ | 0.01 to 0.80 |
| $Q/SiO_2$ | 0.05 to 0.40 |
| $OH/SiO_2$ | 0.15 to 1.00 |
| $H_2O/SiO_2$ | 10 to 100 | wherein M is selected from the group consisting of elements from Groups 1 and 2 of the Periodic Table and Q is a trimethylphenylammonium cation.

3. The method of claim 1, wherein the molecular sieve is prepared from a reaction comprising, in terms of mole ratios, the following:

| | |
|---|---|
| $SiO_2/Al_2O_3$ | 8 to 50 |
| $M/SiO_2$ | 0.20 to 0.60 |
| $Q/SiO_2$ | 0.10 to 0.30 |
| $OH/SiO_2$ | 0.25 to 0.80 |
| $H_2O/SiO_2$ | 15 to 50 | wherein M is selected from the group consisting of elements from Groups 1 and 2 of the Periodic Table and Q is a trimethylphenylammonium cation.

4. The method of claim 1, wherein the source of silicon and aluminum comprises zeolite Y.

5. The method of claim 1, wherein step (a) is performed in the absence of seed crystals.

6. The method of claim 1, wherein the molecular sieve has a composition, as-synthesized and in the anhydrous state, in terms of mole ratios, as follows:

| | |
|---|---|
| $SiO_2/Al_2O_3$ | 5 to 350 |
| $Q/SiO_2$ | 0.015 to 0.15 |
| $M/SiO_2$ | 0.010 to 0.20 | wherein Q is a trimethylphenylammonium cation and M is selected from the group consisting of elements from Groups 1 and 2 of the Periodic Table.

7. The method of claim 1, wherein the molecular sieve has a composition, as-synthesized and in the anhydrous state, in terms of mole ratios, as follows:

| | |
|---|---|
| $SiO_2/Al_2O_3$ | 8 to 50 |
| $Q/SiO_2$ | 0.04 to 0.10 |
| $M/SiO_2$ | 0.05 to 0.20 | wherein Q is a trimethylphenylammonium cation and M is selected from the group consisting of elements from Groups 1 and 2 of the Periodic Table.

8. An aluminosilicate molecular sieve having the CHA framework type and having a composition, as-synthesized and in the anhydrous state, in terms of mole ratios, as follows:

| | |
|---|---|
| $SiO_2/Al_2O_3$ | 5 to 350 |
| $Q/SiO_2$ | 0.015 to 0.15 |
| $M/SiO_2$ | 0.010 to 0.20 | wherein and Q is a trimethylphenylammonium cation and M is selected from the group consisting of elements from Groups 1 and 2 of the Periodic Table.

9. The molecular sieve of claim 8, wherein the molecular sieve has a composition, as-synthesized and in the anhydrous state, in terms of mole ratios, as follows:

| | |
|---|---|
| $SiO_2/Al_2O_3$ | 8 to 50 |
| $Q/SiO_2$ | 0.04 to 0.10 |
| $M/SiO_2$ | 0.05 to 0.20. |

* * * * *